J. N. PARKER.
Knife and Butter-Extractor.

No. 196,164.   Patented Oct. 16, 1877.

WITNESSES
B. Wurzburger
Isaac Neuman

Joseph N. Parker,
INVENTOR by

George A. Sawyer.
ATTORNEY

UNITED STATES PATENT OFFICE.

JOSEPH N. PARKER, OF AUGUSTA, MAINE.

IMPROVEMENT IN KNIFE AND BUTTER-EXTRACTOR.

Specification forming part of Letters Patent No. 196,164, dated October 16, 1877; application filed August 2, 1877.

*To all whom it may concern:*

Be it known that I, JOSEPH N. PARKER, of Augusta, in the county of Kennebec and State of Maine, have invented a new and useful Improved Knife and Extractor, which improvement is fully set forth in the following specification and accompanying drawing, in which—

Figure 1:
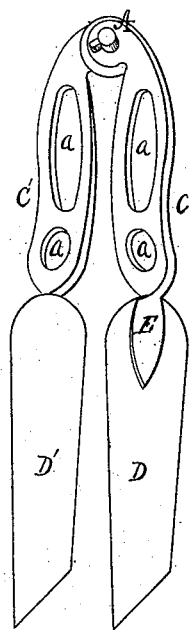
Figure 2:
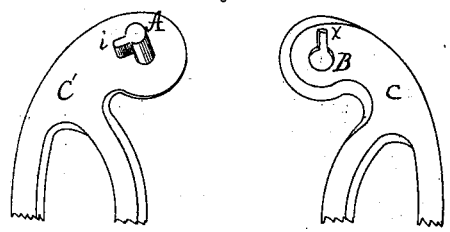

Figure 1 is a perspective view of the knife and extractor ready for use, and Fig. 2 a view of the joint as disconnected.

Like letters of reference indicate like parts.

The object of my invention is to construct a knife and extractor which will facilitate the cutting and extracting of butter, lard, and the like from tubs, jars, &c., and to have the same in good condition, not crumbled or soiled, and the butter in cakes fit for table-use, the knife or extractor to be constructed so as to be taken apart, the blades to be used separately for cutting any substance or in cleaning off any particles of butter, &c., which may adhere to them.

In the drawing, Fig. 1, C and C' are the handles; D and D', the blades, connected to the handles, as shown at E. The handles are cut out at *a a a a*, to admit the fingers when in use. A is a trunnion or dowel on the handle C', having upon it the tang *i*. B is a hole through the handle C, cut out as shown at *x*, to admit of the passage of the trunnion or dowel A with the tang *i* thereon. Fig. 2 is a view of the joint disconnected, showing the construction of the trunnion or dowel A with the tang *i*, and the hole B with the recess *x*, as above described.

To operate the knife or extractor, the blades may be disconnected, and either of them used to cut around the sides of the jar or tub, or in cutting out the piece of the desired size to be extracted. The same may be done in large jars, where there is room enough, by opening the blades far enough so that they will not interfere with each other. The piece cut around is taken out by putting the blades down on two sides of it and grasping them firmly by the handles. This holds the butter, and it is drawn out with the extractor. Lard, tallow, &c., can be taken out in the same manner.

If any particles of the butter or other substance adhere to the blades they may be easily disconnected, and used to scrape and clean each other. When disconnected, one may be used in cleaning out the jar or tub where it is not convenient to use both, and in cutting around the sides of the vessel it is in most cases much more convenient to use the blades separated. Furthermore, when the blades are disconnected, either may be used as a knife to cut butter, lard, tallow, cheese, &c.

The blades and handles are made of brass, iron, or other suitable material, and may be made in one piece or connected, as shown.

It is also obvious that the joint may be made with two tangs upon the trunnion or dowel A, and two recesses or slots cut out from the hole B; or the handles may be disconnected by any other convenient device.

I claim as my invention—

1. A knife and extractor composed of the handle C and blade D, in combination with, and connected to, the handle C' and blade D' by the detachable joint A *i* and B *x*, or its equivalent, substantially as and for the purposes set forth and described.

2. The combination of the blades D and D' with the handles C and C', cut out as shown at *a a a a*, and connected by the detachable joint A *i* B *x*, or its equivalent, as shown and described.

3. A knife and extractor, constructed with two blades with handles thereto, connected by a detachable joint, as set forth and described.

JOSEPH N. PARKER.

Witnesses:
 W. S. CHOATE,
 EUGENE S. FOGG.